United States Patent [19]
Fuchs

[11] 3,939,473
[45] Feb. 17, 1976

[54] PROCESS FOR CORRECTING SIGNAL DISTORTIONS

[75] Inventor: Ernst Alfred Fuchs, Munich, Germany

[73] Assignee: Siemens Aktiengesellschaft, Berlin & Munich, Germany

[22] Filed: Apr. 18, 1974

[21] Appl. No.: 462,025

[30] Foreign Application Priority Data
May 21, 1973 Germany............................ 2325765

[52] U.S. Cl............... 340/146.1 R; 325/41; 325/42; 340/146.1 AV
[51] Int. Cl.² ....................... H03K 5/18; H04L 1/00
[58] Field of Search ........... 340/146.1 R, 146.1 AG, 340/146.1 AV; 325/41, 42

[56] References Cited
UNITED STATES PATENTS

| | | | |
|---|---|---|---|
| 3,524,169 | 8/1970 | McAuliffe et al............ | 340/146.1 R |
| 3,573,727 | 4/1971 | Freeny...................... | 340/146.1 AG |
| 3,646,448 | 2/1972 | Harmon et al................... | 325/41 X |

*Primary Examiner*—R. Stephen Dildine, Jr.

[57] ABSTRACT

A method for correcting signal distortions in frequency-modulated data signals is described. A rectangular binary signal is derived from a faulty demodulated signal, and, using a corrected demodulated signal and the rectangular binary signal, a correction signal is formed. A differential signal is formed from the corrected demodulated signal; the differential signal has zero transitions which coincide with the extreme values of the corrected demodulated signal. A difference signal is formed from the corrected demodulated signal and from the rectangular binary signal. The amplitudes of the difference signal in the time intervals coinciding with the zero transitions of the differentiated signal are equal to the amplitude difference between the rectangular binary signal and the corrected demodulated signal. The correcting signal is obtained from those signal components of the difference signal which occur during the aforementioned time intervals.

6 Claims, 6 Drawing Figures

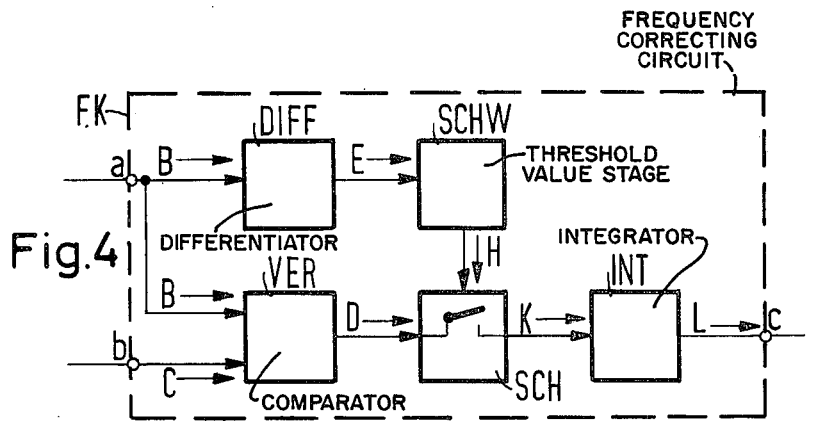
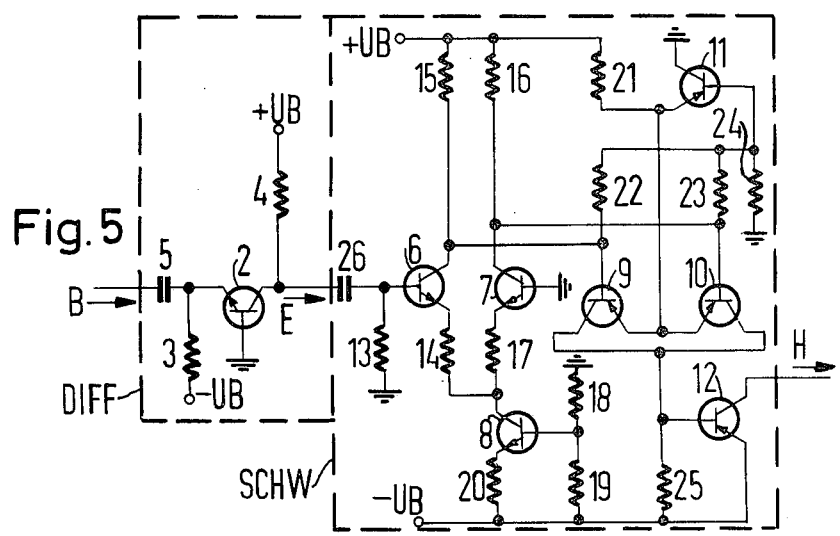
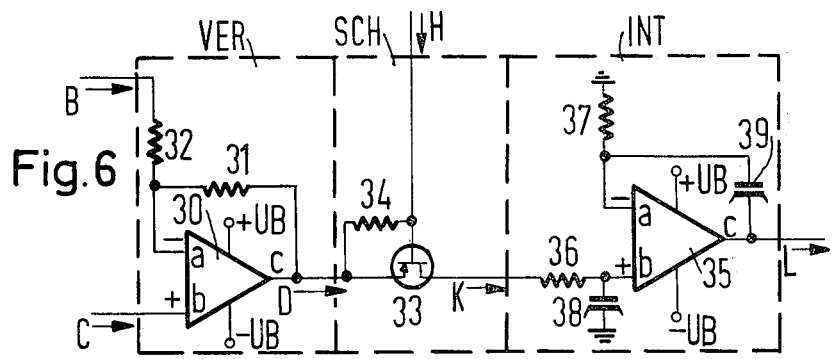

PROCESS FOR CORRECTING SIGNAL DISTORTIONS

BACKGROUND OF THE INVENTION

The invention relates to a process for correcting signal distortions which occur in frequency-modulated data transmission when a rectangular binary signal is derived from a faulty, demodulated signal. In this process a correcting signal is formed using a corrected demodulated signal and the rectangular binary signal and thus the signal distortions are counteracted.

The telegraphy transmission devices operated with frequency modulations, frequency drifts on the transmission path cause distortions of the telegraphy signals at the receiver. As is known, such distortions may be corrected if a correcting signal is formed with the aid of the demodulated signal. Using such a correcting signal, it is possible either to change the d.c. voltage component of the demodulated signal or to carry out a frequency conversion of the signal transmitted across the transmission path in such manner that a substantially fault-free, demodulated signal is emitted. These known processes only operate satisfactorily if the amplitude range of the demodulated signal is equal to a given theoretical value for the duration of individual telegraphy signals.

An object of the invention, therefore, is to provide a process for correcting signal distortions which provides a satisfactory correction even when the amplitude range of the demodulated signal is smaller than the afore-mentioned given theoretical value for the duration of individual pulses of the rectangular binary signal.

SUMMARY OF THE INVENTION

In accordance with the invention in a process of the type described hereinabove, from the corrected demodulated signal, there is formed a differentiated signal, the zero transitions of which coincide with the extreme values of the corrected demodulated signal. From the corrected demodulated signal and from the rectangular binary signal, there is formed a difference signal, the amplitudes of which, in time intervals in the region of the zero transitions of the differentiated signal are equal to the amplitude difference of the binary signal and the corrected demodulated signal. The correcting signal is then obtained from those signal components of the difference signal which occur during the time interval.

The process in accordance with the invention is characterized in that satisfactory correction of the signal distortions is effected even when the amplitude range of the demodulated signal is less than the theoretical amplitude range for the duration of individual pulses of the rectangular binary signal. This type of low amplitude range of the demodulated signal in relation to the theoretical amplitude range occurs in particular when the telegraphy speed is considerably increased. The process in accordance with the invention thus enables an increase in the telegraphy speed with a simultaneous satisfactory correction of the signal distortions.

It is advantageous to form a binary control signal which, for the duration of the time intervals, assumes a first of its two binary values. Using a switch controlled with the control signal, one uses those parts of the difference signal which occur during the time intervals, in order to obtain the correcting signal.

In order to form the control signal, an amplitude-limited signal is obtained from the differentiated signal. The limited signal is composed only from those components of the differentiated signal whose amplitudes are greater or smaller than two given threshold values. Then the control signal can be obtained by amplification and overmodulation, from this amplitude-limited signal.

BRIEF DESCRIPTION OF THE DRAWINGS

In the following is a description of preferred embodiments of the invention making reference to FIGS. 1 to 6, identical components appearing in several figures being marked with the same references.

FIG. 4 is a block circuit diagram of the frequency correcting circuit illustrated in FIGS. 1 and 2, FIG. 5 is a detailed schematic diagram of a differentiating element and a threshold value circuit from the frequency correcting circuit illustrated in FIG. 4, and FIG. 6 is a detailed schematic diagram of a comparator, a switch and an integrator from the frequency correcting circuit represented in FIG. 4.

DETAILED DESCRIPTION OF THE DRAWINGS

In accordance with FIG. 1, data signals are emitted from a data source DQ with the aid of a binary signal, the binary values of which are characterized by two amplitudes which in the following will be referred to as 0 and 1. The binary signal, for example a telegraphy signal, will be assumed to be one whose individual bits lie within a given bit pattern. This binary signal is conducted to a transmitter SE and via the transmission path ST a frequency-modulated signal is transmitted. The transmitted signal has characteristic frequencies which correspond to the binary values of the binary signal emitted by the data source DQ. The transmission path ST generally gives rise to frequency drifts.

In the demodulator DEM a signal A is formed from the frequency-modulated signal. The signal has amplitudes corresponding to the binary values.

Figure 3:
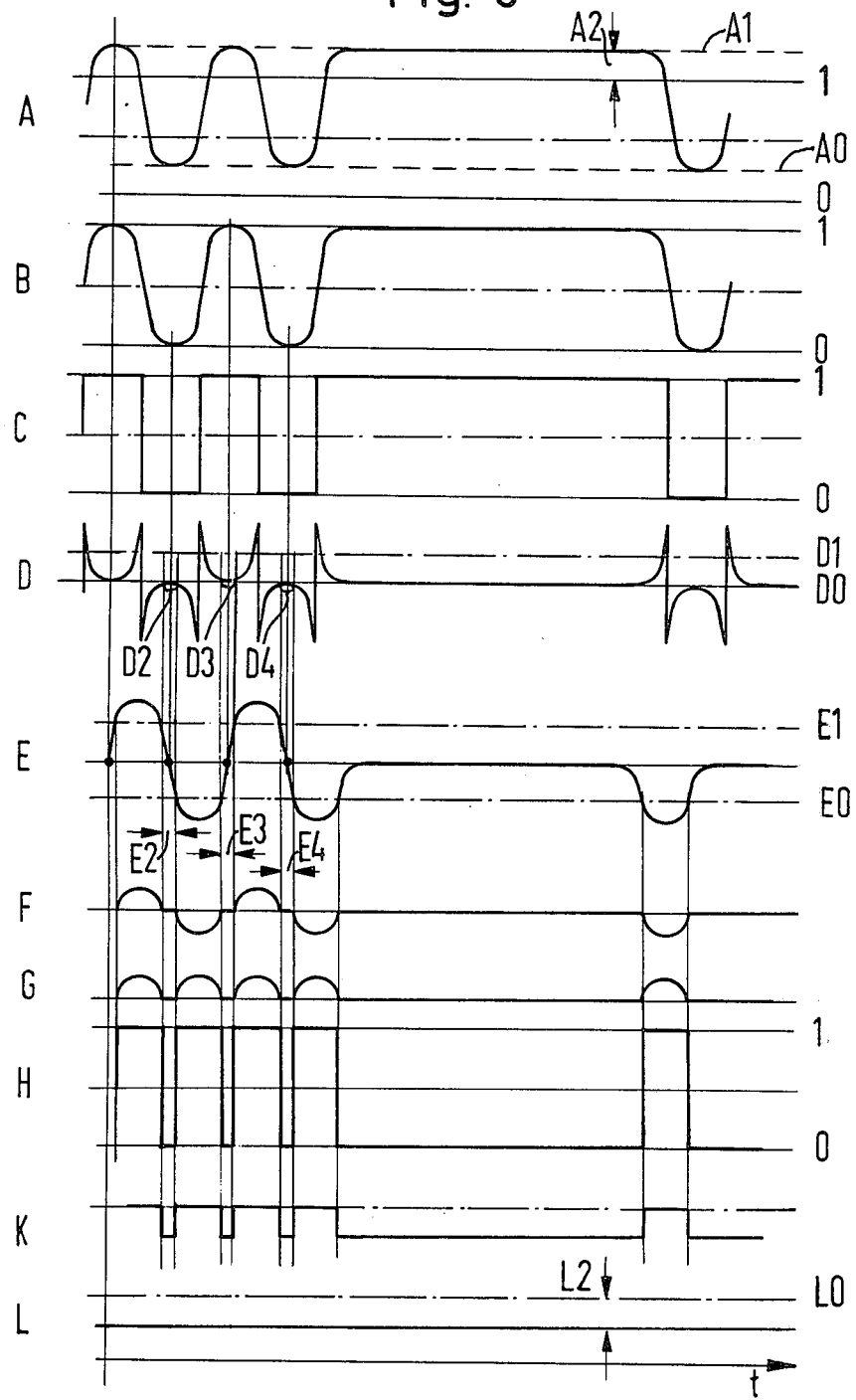
FIG. 3 is a time-waveform diagram illustrating signals which occur in the systems illustrated in FIGS. 1 and 2.

FIG. 3 depicts the signal A, whose levels A0 and A1 characterize the two binary values which are to be transmitted. As a result of the frequency drifts occurring in the transmission path, these levels A0 and A1 differ from the levels which are assigned to the binary values 0 and 1. For example, the level A1 differs from the level assigned to the binary value 1 by the amount A2. These levels A0 and A1 would give rise to one-sided drifts and are therefore corrected.

Figure 1:
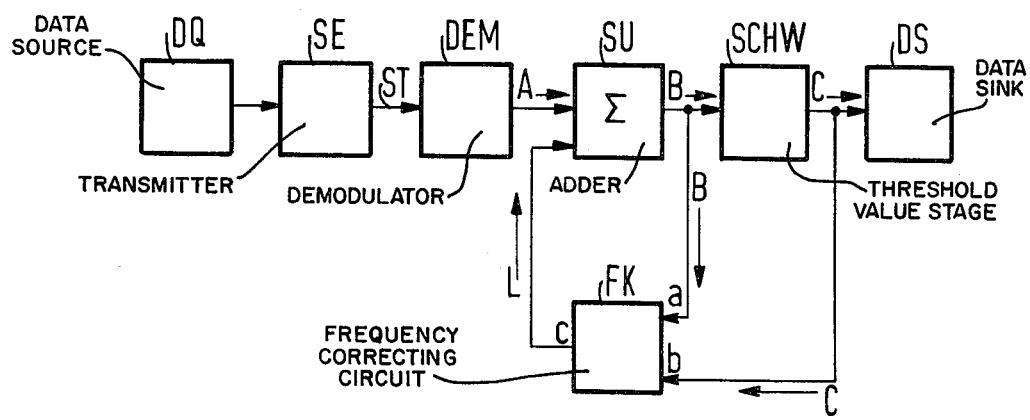
FIG. 1 is a block circuit diagram of a frequency-modulated data transmission system in which the d.c. voltage of the demodulated signal is corrected.

Using adder SU in FIG. 1 and the frequency correcting circuit FK, the d.c. voltage of the signal A is corrected in such manner that the signal B illustrated in FIG. 3 is formed. This signal B is conducted to the threshold value stage SCH which effects a pulse regeneration and feeds the rectangular signal C to a data sink DS. The data sink DS can for example take the form of a teleprinter.

Figure 2:
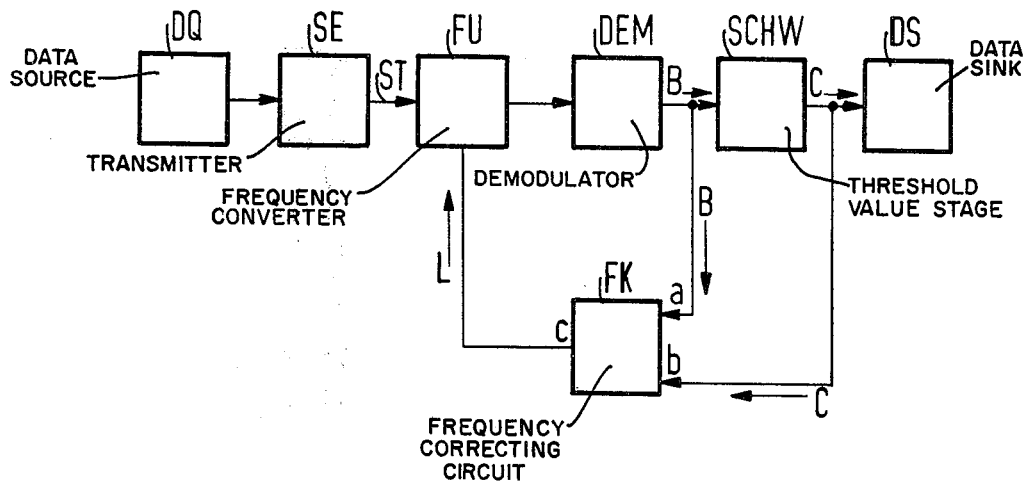
FIG. 2 is a block circuit diagram of a frequency-modulated data transmission system in which the transmitted signal is frequency converted, using a correcting signal in such manner that signal distortions are avoided.

The circuit arrangement illustrated in FIG. 2 differs from that shown in FIG. 1 only in respect of the correction of the signal transmitted across the transmission path ST. As shown in FIG. 2, at the receiver, the demodulator DEM is preceded by a frequency converter FU which is supplied with the correcting signal L for effecting a frequency correction. In this way the correcting signal L serves to eliminate deviations of the Characteristic frequencies from the theoretical frequencies so that the demodulator DEM emits the corrected, demodulated signal B.

FIG. 4 shows in more detail the frequency correcting circuit FK which is schematically illustrated in FIG. 1 and 2. This circuit includes a differentiator element DIFF, a threshold value stage SCHW, a comparator VER, a switch SCH and an integrator INT.

In the following the mode of operation of the frequency correcting circuit illustrated in FIG. 4 is explained making reference to the signals represented in FIG. 3. Using the differentiator stage DIFF, the signal E is obtained from the signal B. By means of amplitude limitation, those signal components of the signal E whose amplitudes are greater than the amplitude E1 and smaller than the amplitude E0 are further processed. In this way the signal F is formed and, by total forming, the signal G. By means of amplification and overmodulation, the signal H is formed from signal G; signal H controls the switch SCH represented in FIG. 4. The 0-value of the signal H causes the switch SCH to establish a conductive connection, whereas the 1-value brings the switch into the illustrated switching position.

The comparator VER is supplied with the signals B and C, and the difference of the signals C-B is formed so that the signal D is produced. In the steady state the level Do is assigned a d.c. voltage of zero volts, whereas in the transient state the d.c. component of the signal D is displaced in such manner that the level D1 is assigned the amount 0 V. During the length of time in which the signal H assumes the 0-values, signal components of the signal D are transmitted via the switch SCH so that the signal K is produced. When this signal has been integrated in the integration stage INT, the signal L is formed from the signal K. The d.c. voltage of signal L is displaced by the amount L2 in relation to the zero line L0. It is to be noted that it is only the direct current component of signal L which is of significance herein; it will be understood that this d.c. value will have a negligibly small interfering voltage superimposed thereon.

The signal A and the singal L are conducted to the adder SU depicted in FIG. 1, and by addition, the d.c. voltage of the signal A is reduced so that the signal B is produced. The amounts A2 and L2 are thus approximately equal. In accordance with FIG. 2 the oscillator frequency of the frequency converter FU is adjusted with the signal L.

It is only in the case of a fully built-up signal that the actual values 0 and 1 and the theoretical values A0 and A1 agree with one another. In the case of a signal which is not fully built up, these theoretical values are never reached. Since the signals K and L are only obtained from signal components of the signal D, which are obtained during the times E2, E3, E4 during the zero transitions of the signal E, the described frequency correcting circuit proves valuable even when the actual amplitudes of the signal A do not agree with the theoretical amplitudes and the signal A thus does not fully build up. Experiments have shown that even when the actual amplitudes of the signal A only reach the theoretical amplitudes by up to 75%, frequency fault correction is possible. Under otherwise identical circumstances, it is thus possible to increase the telegraphy speed.

FIG. 5 shows details of the differentiating element DIFF and of the threshold value stage SCHW. The differentiator element DIFF comprises a transistor 2, resistors 3, 4 and capacitor 5. One end of resistor 3 is connected to the negative operating voltage −UB, and one end of resistor 4 is connected to the positive operating voltage +UB. The base of the transistor 2 is connected to earth, the potential of which lies in the center between the negative operating voltage −UB and the positive operating voltage +UB.

The threshold value stage SCHW includes transistors 6, 7, 8, 9, 10, 11, 12, resistors 13, 14, 15, 16, 17, 18, 19, 20, 21, 22, 23, 24, 25 and capacitor 26. In this embodiment the transistors 6, and 7, the resistors 13 to 20 and the capacitor 26 form a push-pull amplifier.

FIG. 6 shows details of the comparator VER, of the switch SCH and of the integrator INT. The comparator VER comprises operational amplifier 30 and resistors 31 and 32. Signals which are conducted via the input a of the operational amplifier 30 produce at the output c, amplified signals whose phase is rotated by 180°. Signals which are conducted to the input b produce at the output c amplified signals whose phase is unchanged.

The switch SCH comprises a field effect transistor 33 and a resistor 34. The field effect transistor 33 is controlled with the signal H in such manner that the parts D2, D3, D4 of the signal entered in FIG. 3 are allowed through, thus resulting in the signal K.

The integrator INT comprises an operational amplifier 35, resistors 36, 37 and the capacitors 38, 39. The operational amplifier 35 operates like the operational amplifier 30 of the comparator VER.

The preferred embodiments described hereinabove are intended only to be exemplary of the principles of the invention. It is contemplated that the described embodiments can be modified or changed while remaining within the scope of the invention as defined by the appended claims.

I claim:

1. A method for correcting signal distortions occurring in frequency-modulated data signals by deriving a rectangular binary signal from a defective demodulated signal using a correction signal, comprising the steps of:
    differentiating the corrected demodulated signal to form a differential signal having zero transitions coinciding with the extreme values of the corrected demodulated signal,
    forming a difference signal having amplitudes equal to the amplitude difference between the rectangular binary signal and the corrected demodulated signal at points in time coinciding with the time regions of the zero transitions of the differentiated signal and
    producing said correcting signal from those components of said difference signal which occur at said points in time.

2. The method defined in claim 1 comprising the additional step of:
    forming a binary control signal which for the duration of said points in time assumes a first binary value, and wherein:

said producing step includes coupling said difference signal through a switch means to an integration means from which said correction signal is emitted, said switching means being controlled with said binary control signal to pass the components of said difference signal occurring at said points in time.

3. The method defined in claim 2 comprising the additional step of:

generating an amplitude limited signal constituted by those components of said differentiated signal having amplitudes greater than or less than two predetermined values of said differentiated signal and wherein the step of forming said binary control signal comprises amplification and over-modulation of said amplitude limited signal.

4. The method defined in claim 1 wherein said defective demodulated signal and said correcting signal are added to form a corrected demodulated signal.

5. The method defined in claim 1 comprising the additional step of:

effecting a frequency shift of the signal to be demodulated.

6. The method defined in claim 1 wherein the step of forming the difference signal comprises compairing the corrected demodulated signal with a signal of a predetermined value to produce said difference signal.

* * * * *